(12) United States Patent
Shim et al.

(10) Patent No.: US 6,473,145 B1
(45) Date of Patent: Oct. 29, 2002

(54) REFLECTIVE LIQUID CRYSTAL DISPLAY DEVICE USING A REFLECTIVE PLATE HAVING LIGHT WEIGHT

(75) Inventors: Hwan Soo Shim, Kyoungki-do; Dong Hae Seo, Taegu; Jae Jin Lee; Sang Un Choi, both of Kyoungki-do, all of (KR)

(73) Assignee: Hyundai Display Technology Inc., Kyoungki-do (KR)

( * ) Notice: Subject to any disclaimer, the term of this patent is extended or adjusted under 35 U.S.C. 154(b) by 24 days.

(21) Appl. No.: 09/656,371

(22) Filed: Sep. 6, 2000

(30) Foreign Application Priority Data

Sep. 9, 1999 (KR) ............................................. 99-38378

(51) Int. Cl.[7] ....................... G02F 1/136; G02F 1/1335; G02F 1/1343
(52) U.S. Cl. ......................... 349/113; 349/44; 349/106; 349/110; 349/139
(58) Field of Search ........................... 349/113, 44, 106, 349/110, 139

(56) References Cited

U.S. PATENT DOCUMENTS

| | | | |
|---|---|---|---|
| 5,412,492 A | * | 5/1995 | Zammit et al. ................. 349/1 |
| 5,550,658 A | * | 8/1996 | Yoshihiro ..................... 349/62 |
| 6,018,379 A | | 1/2000 | Mizobata et al. |
| 6,061,111 A | * | 5/2000 | Kataoka et al. ............. 349/113 |
| 6,097,458 A | | 8/2000 | Tsuda et al. |
| 6,104,460 A | | 8/2000 | Abe et al. |
| 6,184,956 B1 | * | 2/2001 | Kang et al. .................. 349/113 |
| 6,219,113 B1 | * | 4/2001 | Takahara ...................... 349/42 |

FOREIGN PATENT DOCUMENTS

| | | | |
|---|---|---|---|
| JP | 01317244 A | * | 12/1989 |
| KR | 0079770 | | 11/1999 |

* cited by examiner

Primary Examiner—William L. Sikes
Assistant Examiner—Julie Ngo
(74) Attorney, Agent, or Firm—Ladas & Parry

(57) ABSTRACT

The present invention discloses a reflective plate having lightweight functioning as a substrate and a reflective LCD using the same. The reflective LCD according to the present invention comprises: a transparent insulating substrate; a gate bus line and a data bus line formed at an inner side of the substrate and defining a pixel region; a pixel electrode formed in the pixel region; a switching device operating the pixel electrode by receiving the signals of the gate bus line and the data bus line; a black matrix formed on the surface of the substrate 1s and covering a portion at which the gate bus line, the data bus line, and the switching device are formed; color filters respectively formed at the outsides of the black matrix; and a plastic reflective plate opposing to the inner side of the substrate, wherein the plastic reflective plate comprises: a plastic plate; a photoresist layer disposed on the plastic plate and having an uneven portion on the surface thereof; a reflective film having a high reflectance coated on the photoresist layer having the uneven portion; a planarization layer formed on the photoresist layer so as to planarize the surface of the photoresist layer; a transparent electrode disposed over the planarization layer; and an alignment layer formed over the transparent electrode.

9 Claims, 7 Drawing Sheets

REFLECTIVE LIQUID CRYSTAL DISPLAY DEVICE USING A REFLECTIVE PLATE HAVING LIGHT WEIGHT

BACKGROUND OF THE INVENTION

1. Field of the Invention

The present invention relates to a reflective liquid crystal display device(LCD) and more particularly to a reflective plate having lightweight and a reflective LCD using the same.

2. Description of the Related Art

A Reflective LCD generally comprises upper and lower substrates opposite to each other, a liquid crystal layer interposed between the upper and lower substrates, a polarization plate formed at an outside of an upper substrate, and a reflective plate formed at an outside of the lower substrate.

A black matrix is formed on the upper substrate so as to define a sub-pixel and a color filter is formed in the space surrounded by the black matrix.

A switching device and a pixel electrode are formed at each sub-pixel of the lower substrate.

Such reflective LCD utilizes natural light instead of separate light source.

Consequently, when a natural light is entered from the upper substrate, it is reflected again by a reflective plate at a lower face of the lower substrate after passing the upper substrate, the liquid crystal layer, and the lower substrate. At this time, the light is absorbed or passed depending on an arranged condition of liquid crystal molecules.

The thickness of upper and lower glass substrates has been reduced in order to lighten the aforementioned conventional reflective LCD as well as most LCDs.

However, since the thickness of a substrate now reaches the limit and is not fully lightened, an art capable of replacing materials of a substrate is on study.

For example, an art using a plastic substrate lighter than glass instead of a glass substrate is proposed. This plastic substrate, however, is thermally, chemically, and mechanically damaged during a formation process of an array pattern and a formation process of a color filter thereby deteriorating the picture quality of an LCD.

SUMMARY OF THE INVENTION

Accordingly, it is an object of the present invention to provide a reflective plate having lightweight as well as functioning as a substrate.

Furthermore, it is another object of the present invention to provide a reflective LCD using a reflective plate with lightweight capable of improving the picture quality.

To accomplish the aforementioned objects of the present invention, a reflective plate of the present invention comprises: a plastic plate; a photoresist layer disposed on the plastic plate and having an uneven portion on the surface thereof; and a reflective film having a high reflectance coated on the photoresist layer having the uneven portion. Herein, the photoresist layer is a polycarbonate layer.

Moreover, the high reflective film further comprises: a planarization layer formed on the photoresist layer so as to planarize the surface of the photoresist layer; a transparent electrode disposed over the planarization layer; and an alignment layer formed over the transparent electrode.

Furthermore, the high reflective film further comprises: a planarization formed on the photoresist layer so as to planarize the surface of the phtoresist layer; an alignment layer disposed over the planarization layer; and a transparent electrode formed at the back side of the plastic substrate. The reflective film having a high reflectance is an aluminum layer.

And, a reflective LCD according to the present invention comprises: a transparent insulating substrate; a gate bus line and a data bus line formed at an inner side of the substrate and defining a pixel region; a pixel electrode formed in the pixel region; a switching device operating the pixel electrode by receiving the signals of the gate bus line and the data bus line; a black matrix formed on the surface of the substrate and covering a portion at which the gate bus line, the data bus line, and the switching device are formed; color filters respectively formed at the outsides of the black matrix; and a plastic reflective plate opposing to the inner side of the substrate. Herein, the plastic reflective plate comprises: a plastic plate; a photoresist layer disposed on the plastic plate and having an uneven portion on the surface thereof; a reflective film having a high reflectance coated on the photoresist layer having the uneven portion; a planarization layer formed on the photoresist layer so as to planarize the surface of the photoresist layer; a transparent electrode disposed over the planarization layer; and an alignment layer formed over the transparent electrode.

Further, a reflective LCD according to another embodiment of the present invention comprises: a transparent insulating substrate; a gate bus line and a data bus line formed at an inner side of the substrate and defining a pixel region; a pixel electrode formed in the pixel region; a switching device operating the pixel electrode by receiving the signals of the gate bus line and the data bus line; a black matrix formed on the surface of the insulating substrate and covering a portion at which the gate bus line, the data bus line, and the switching device are formed; color filters respectively formed at the outsides of the black matrix; and a plastic reflective plate opposing to the inner side of the insulating substrate. Herein, the plastic reflective plate comprises: a plastic plate; a photoresist layer disposed on the plastic plate and having an uneven portion on the surface thereof; a reflective film having a high reflectance coated on the photoresist layer having the uneven portion; a planarization layer formed on the photoresist layer so as to planarize the surface of the photoresist layer; an alignment layer disposed over the planarization layer; and a transparent electrode discharging static electricity at the back side of the plastic plate.

BRIEF DESCRIPTION OF THE DRAWINGS

The objects, aspects, and advantages of the present invention may be far more understood with reference to the following detailed description and the attached drawings.

DETAILED DESCRIPTION OF THE INVENTION

Figure 1:
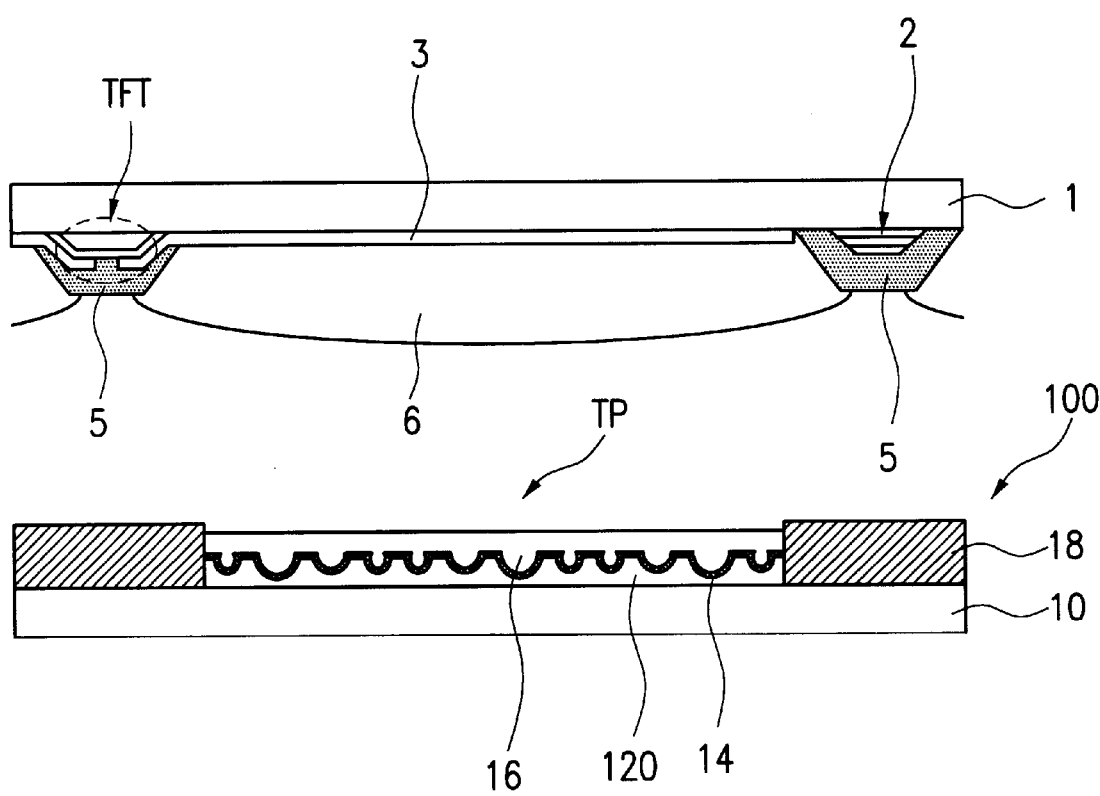
FIG. 1 is a cross-sectional view of a reflective LCD using a reflective plate having lightweight according to the present invention.

Referring to FIG. 1, a transparent insulating substrate 1 opposes to a plastic reflective plate 100 at a selected distance.

A gate bus line(not shown) and a data bus line 2 are arranged in matrix types at an inner side of the insulating substrate 1. A thin film transistor(TFT) as a switching device is formed at an intersection of the gate bus line and the data bus line 2. A pixel electrode 3 is connected to one side of the TFT so that the pixel electrode is operated depending on the signals of the gate bus line and the data bus line 2. A black matrix 5 is formed on the surfaces of the TFT, the gate bus line, and the data bus line of the substrate 1. The black matrix 5 is made of an insulating material containing black dye. Color filters 6 are formed respectively on the surface of the substrate 1 at both sides of the black matrix 5, preferably on the surface of the pixel electrode 3.

An uneven portion(TP) is formed on a reflective plate corresponding to the color filter 6. The reflective plate 10 opposing to the substrate 1 has the uneven portion at portion corresponding to the color filter 6 and a light absorption layer 18 for preventing a light interference phenomenon due to the uneven portion(TP) are disposed at the portions opposing to the black matrix 5. The surface of the uneven portion(TP) is planarized by a transparent planarization layer 16.

The structure of such reflective plate according to the present invention will be described in detail with reference to FIGS. 2 and 3. Herein FIG. 2 shows a reflective plate applied to a twist nematic mode and FIG. 3 shows a reflective plate applied to an IPS mode wherein IPS is In Plane Switching.

Figure 2:
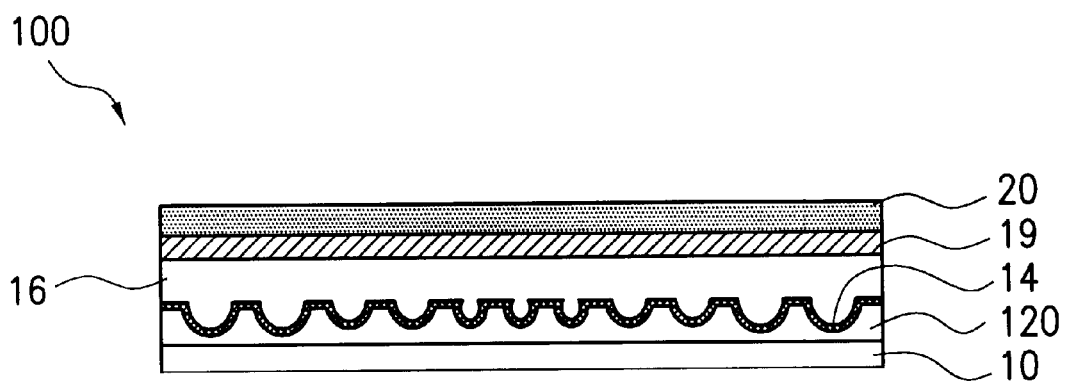
FIG. 2 is a cross-sectional view of a reflective plate having lightweight applied to a twist nematic mode according to the present invention.
Figure 3:
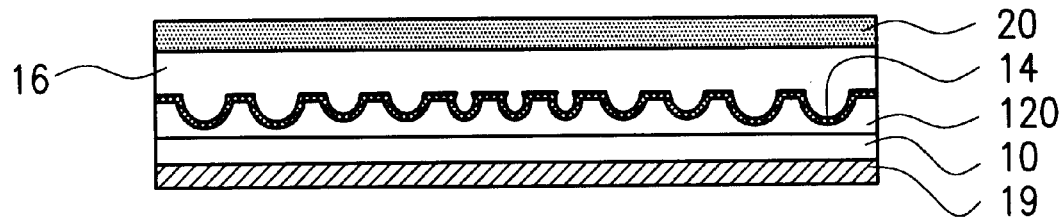
FIG. 3 is a cross-sectional view of a reflective plate having lightweight applied to an IPS mode according to the present invention.

Referring to FIGS. 2 and 3, a hardened photoresist layer 120 having an uneven portion is disposed on the plastic plate 10. Polycarbonate having an excellent adhesion strength to plastic is used as the photoresist layer 120. A reflective film 14 having a high reflectance is formed on the photoresist layer 120. An aluminum layer is used as the reflective film 14. A planarization layer 16 is formed on the photoresist layer 120 having the uneven portion.

In case of a twist nematic mode, a transparent electrode 19 is formed on the planarization layer 16 so as to form an electric field with the pixel electrode 3 of the transparent insulating substrate 1 and an alignment layer 20 is formed on the transparent electrode 19. In case of an IPS mode, an alignment layer 20 is formed on the planarization layer 16 and a transparent electrode 19 is disposed at the back side of a plastic substrate 10 so as to be used for only discharging static electricity. At this time, in case of the IPS mode, a common electrode is formed on the transparent insulating substrate.

Such reflective plate 100 has a reflective film, a transparent electrode, and an alignment layer thereby functioning as a substrate as well as a reflective plate. And, since the reflective plate 100 does not undergo a patterning process, a plastic plate can be used as the reflective plate 100. Therefore, the reflective plate has lighter weight than the conventional reflective plate using a glass substrate.

A method of fabricating such reflective plate 100 is as follows.

Figure 4A:
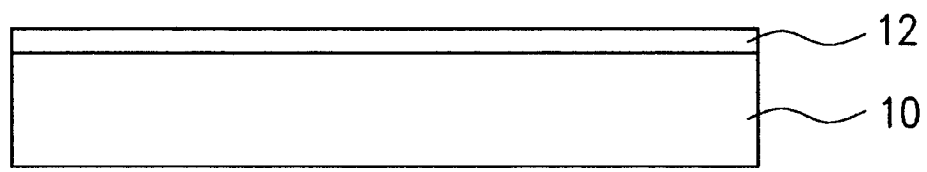
FIGS. 4a to 4e are cross-sectional views for describing a method of fabricating a lightened reflective plate according to the present invention.
Figure 6:
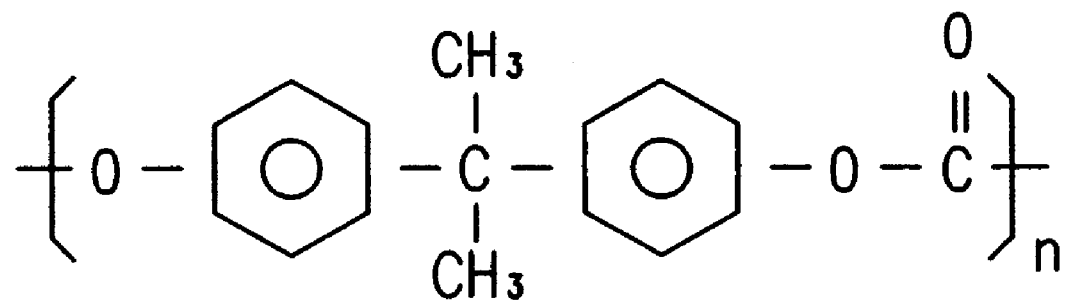
FIG. 6 is a drawing showing a chemical structure formula of a photoresist layer used in the present invention.

First, as shown in FIG. 4a, a photoresist layer 12 is formed on a plastic plate 10. The photoresist layer 12 has an excellent adhesion strength to the plastic plate 10, e.g. uses a polycarbonate layer having a chemical structure formula as shown in FIG. 6.

Figure 4B:
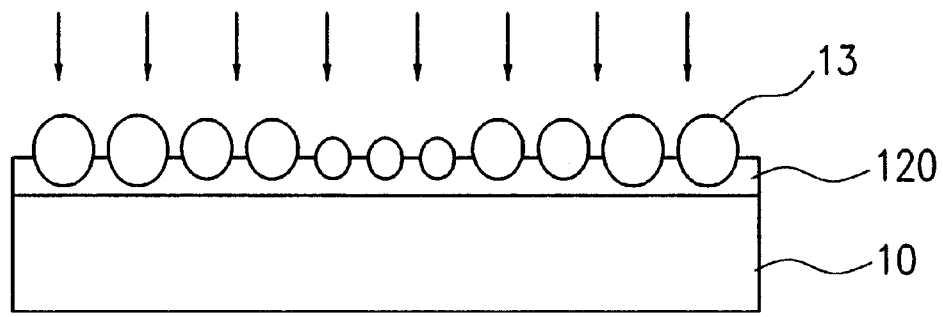
Figure 4C:
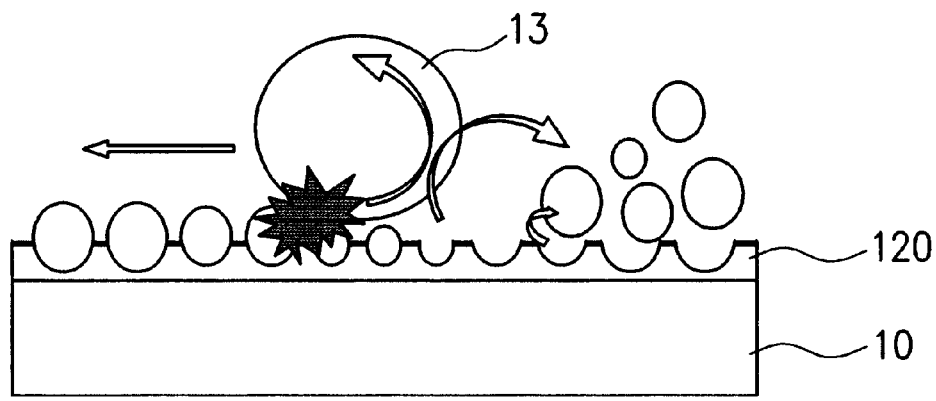

Next, as shown in FIG. 4b, spacers 13 are spread in the photoresis layer 120. At this time, spread of the spacers 13 can be differently controlled every sub-pixel R, G, and B. The phtoresist layer 120 in which the spacers 13 are spread is hardened. The hardening process is performed by heat or UV. The hardened photoresist layer in the drawings is marked with 120.

Afterward, as shown in 4c, the hardened photoresist layer 120 is rubbed so as to remove the spacers 13 from the photoresist layer 120.

Figure 4D:
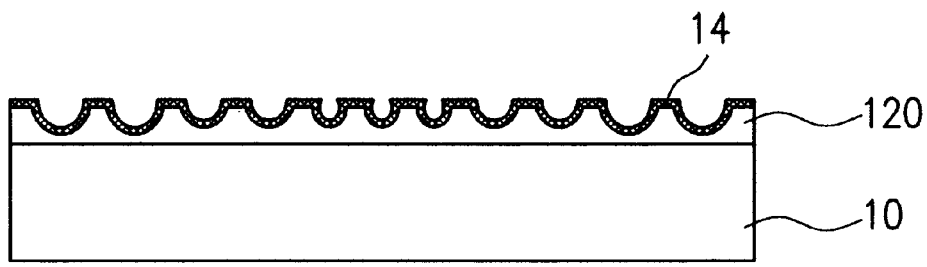

Next, as shown in FIG. 4d, the spacers 13 are removed thereby forming an uneven portion on the surface of the photoresist layer 120. A reflective film 14 having a high reflectance is formed, e.g. by coating an aluminum layer, on the surface of the photoresist layer 120 having the uneven portion.

Figure 4E:
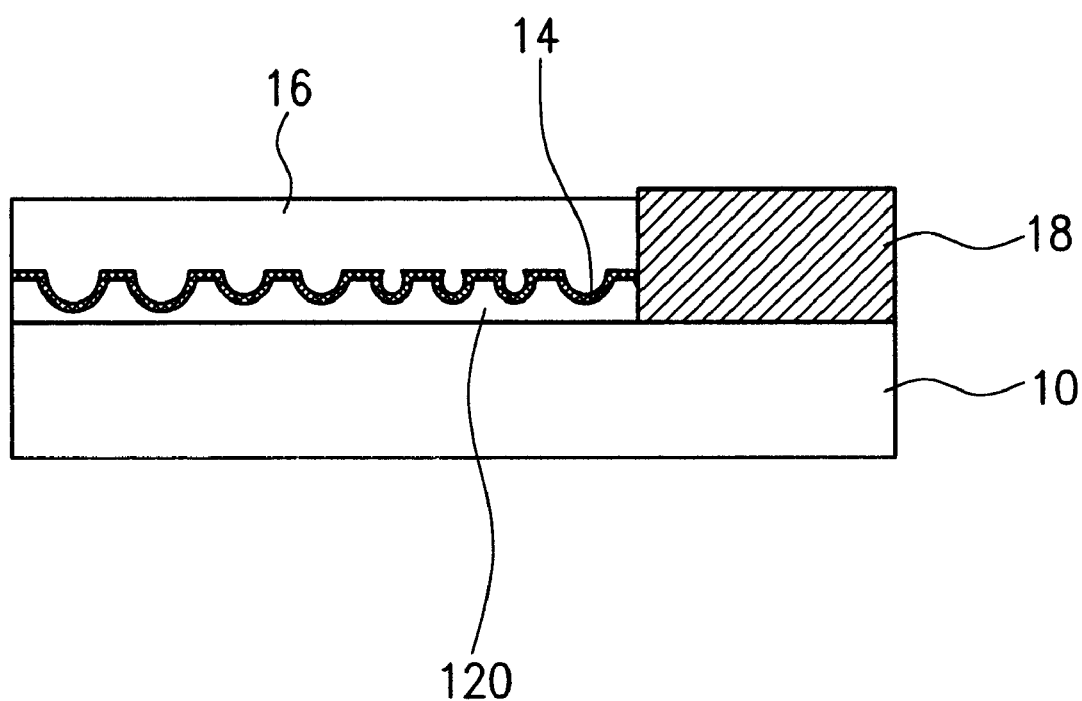

Sequentially, as shown in FIG. 4e, a planarization layer 16 is formed over the photoresist layer 120 on which the reflective film 14 is formed. A light absorption layer 18 absorbing light is formed on a selected portion.

Figure 5:
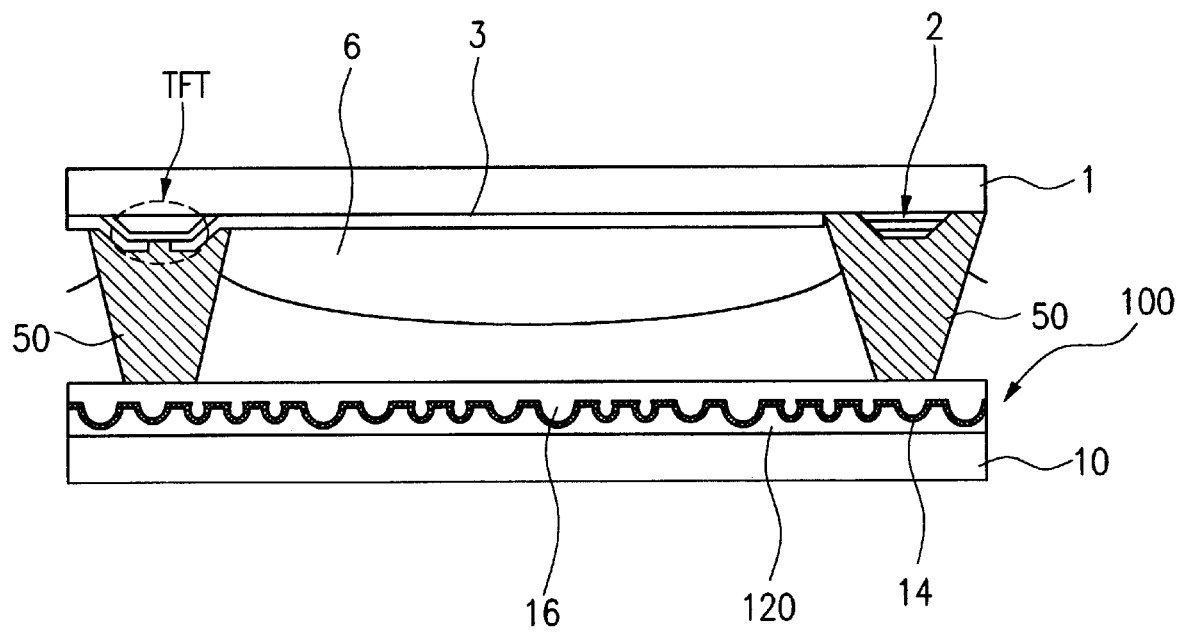
FIG. 5 is a cross-sectional view of a reflective LCD using a reflective plate having lightweight according to another embodiment of the present invention.

Meanwhile, as shown in FIG. 5, a light absorption layer is not formed and the height of a black matrix 50 in the transparent insulating substrate 1 is extended by a distance between the substrate 1 and the reflective plate 100. If so, the black matrix 50 functions as a wall intercepting light interference thereby completely intercepting light interference as above.

As described in detail above, in a reflective LCD according to the present invention, a gate bus line, a data bus line, a TFT and a pixel electrode are disposed on a transparent insulating substrate, a black matrix is formed on a resultant, and a color filter is formed over the pixel electrode. The opposing reflective plate is made of a plastic plate with an uneven portion, and a transparent electrode and an alignment layer are formed over the reflective plate.

Consequently, a reflective plate is made of plastic with lightweight and functions as a reflective plate and a substrate thereby lightening a reflective LCD.

Furthermore, since the reflective plate made of plastic does not undergo a patterning process, damage to S the plastic plate is not caused. Therefore, picture quality is not deteriorated.

Various other modifications will be apparent to and can be readily made by those skilled in the art without departing from the scope and spirit of the present invention.

What is claimed is:

1. A reflective plate having light weight, comprising:

a plastic plate;

a photoresist layer disposed on the plastic plate and having an uneven portion in the surface thereof;

a reflective film having a high reflectance coated on the photoresist layer having the uneven portion;

a planarization layer formed on the photoresist layer so as to planarize the surface of the photoresist layer;

an alignment layer disposed over the planarization layer; and a transparent electrode formed at the back side of the plastic substrate.

2. The reflective plate according to claim 1, wherein the photoresist layer is a polycarbonate layer.

3. The reflective plate according to claim 1, wherein the reflective film having a high reflectance is an aluminum layer.

4. A reflective liquid crystal display device using a reflective plate having light weight, comprising:
- a transparent insulating substrate;
- a gate bus line and a data bus line formed at an inner side of the substrate and defining a pixel region;
- a pixel electrode formed in the pixel region;
- a switching device operating the pixel electrode by receiving the signals of the gate bus line and the data bus line;
- a black matrix formed on the surface of the substrate and covering a portion at which the gate bus line, the data bus line, and the switching device are formed;
- color filters respectively formed between the black matrixes; and
- a plastic reflective plate opposing to the inner side of the substrate, wherein the plastic reflective plate comprises: a plastic plate; a photoresist layer disposed on the plastic plate and having an uneven portion on the surface thereof; a reflective film having a high reflectance coated on the photoresist layer having the uneven portion; a planarization layer formed on the photoresist layer so as to planarize the surface of the photoresist layer; an alignment layer disposed over the planazation layer; and a transparent electrode formed at the back side of the plastic plate.

5. The reflective plate according to claim 4, wherein the photoresist layer is a polycarbonate layer.

6. The reflective plate according to claim 4, wherein the reflective film having a high reflectance is an aluminum layer.

7. A reflective liquid crystal display device using a reflective plate having light weight, comprising:
- a transparent insulating substrate;
- a gate bus line and a data bus line formed at an inner side of the substrate and defining a pixel region;
- a pixel electrode formed in the pixel region;
- a switching device operating the pixel electrode by receiving the signals of the gate bus line and the data bus line;
- a black matrix formed on the surface of the insulating substrate and covering a portion at which the gate bus line, the data bus line, and the switching device are formed;
- color filters respectively formed between the black matrixes; and
- a plastic reflective plate opposing to the inner side of the insulating substrate,
- wherein the plastic reflective plate comprises: a plastic plate; a photoresist layer disposed on the plastic plate and having an uneven portion on the surface thereof; a reflective film having a high reflectance coated on the photoresist layer having the uneven portion; a planarization layer formed on the photoresist layer so as to planarize the surface of the photoresist layer; an alignment layer disposed over the planarization layer; and a transparent electrode discharging static electricity at the back side of the plastic plate.

8. The reflective plate according to claim 7, wherein the photoresist layer is a polycarbonate layer.

9. The reflective plate according to claim 7, the reflective film having a high reflectance is an aluminum layer.

* * * * *